(12) United States Patent
Baune

(10) Patent No.: US 7,284,017 B2
(45) Date of Patent: Oct. 16, 2007

(54) DATA MIGRATION SYSTEM AND METHOD

(75) Inventor: Donald Allen Baune, Thornton, CO (US)

(73) Assignee: Storage Technology Corporation, Louisville, CO (US)

( * ) Notice: Subject to any disclaimer, the term of this patent is extended or adjusted under 35 U.S.C. 154(b) by 492 days.

(21) Appl. No.: 10/747,489

(22) Filed: Dec. 29, 2003

(65) Prior Publication Data

US 2005/0149575 A1 Jul. 7, 2005

(51) Int. Cl.
*G06F 17/30* (2006.01)

(52) U.S. Cl. ...................................... 707/200; 707/205

(58) Field of Classification Search ................ 707/204, 707/102, 200, 205; 395/200.33; 709/211
See application file for complete search history.

(56) References Cited

U.S. PATENT DOCUMENTS

| | | | |
|---|---|---|---|
| 5,684,990 A | | 11/1997 | Boothby |
| 5,940,594 A * | | 8/1999 | Ali et al. .................... 709/203 |
| 5,953,729 A * | | 9/1999 | Cabrera et al. ............. 707/204 |
| 6,353,878 B1 | | 3/2002 | Dunham |
| 6,480,860 B1 * | | 11/2002 | Monday ..................... 707/102 |
| 6,502,205 B1 | | 12/2002 | Yanai et al. |
| 2003/0208505 A1 * | | 11/2003 | Mullins et al. ............. 707/102 |
| 2003/0217083 A1 * | | 11/2003 | Taylor ........................ 707/204 |

FOREIGN PATENT DOCUMENTS

EP 0 848 321 A2 6/1998

* cited by examiner

*Primary Examiner*—Don Wong
*Assistant Examiner*—Hung Tran Vy
(74) *Attorney, Agent, or Firm*—Brooks Kushman P.C.

(57) ABSTRACT

A method, system and program are disclosed for increasing the data transfer rates and efficiencies of processes used for migrating digital data from one long-term storage media to a second long-term storage media. A flat-file can be created and used as a work-list to read the data from the first long-term storage media. The data can then be transferred by data streaming to a workspace on a disk cache associated with the second long-term storage media. Logical units of the data in the workspace can be converted into a BLOB format and stored on a server associated with the second long-term storage media. A second flat-file can be created and used as an update reference for a database associated with the first long-term storage media. Using the second flat-file as a reference, a mass update of the database associated with the first long-term storage media can be performed to modify the database pointers so that they point to the locations of the BLOB data in the server associated with the second long-term storage media. After the data transfer from the first long-term storage media to the second long-term storage media is completed, the transferred data can be validated and the first long-term storage media retired.

19 Claims, 2 Drawing Sheets

DATA MIGRATION SYSTEM AND METHOD

BACKGROUND OF THE INVENTION

1. Field of the Invention

The present invention relates generally to improved data migration for archived information, and in particular, but not exclusively to, an improved system and method for migrating digital medical patient image data from one long-term storage media to a second long-term storage media.

2. Background of the Invention

Picture Archiving and Communication Systems (PACS) are data storage environments that can be used to acquire, manage and display medical diagnostic image information about patients. Typical PACS provide picture viewing capabilities at diagnostic and reporting workstations, archiving on magnetic or optical media for short-term or long-term storage, communications using Local Area Networks (LANs), Wide Area Networks (WANs) or publicly-available communications services, and modality interfaces and gateways to healthcare facility and departmental information systems. A primary goal of most PACS users is to convert their traditionally film-based image departments to film-less or nearly film-less operations.

A significant problem that exists in this field relates to the long-term storage and management of the digital image data. As digital image storage technologies evolved, prudent data storage managers found it necessary to migrate their image data from older storage media to newer long-term storage environments. For example, as the known DLT-2000 magnetic tape cartridge storage media became obsolete, data storage managers found it necessary to transfer their image data from DLT-2000 tapes to the next generation tape storage media. In fact, the need to transfer or migrate patient image data from older to newer storage media typically arises numerous times during the legal retention times required for the patient image data involved.

FIG. 1 depicts a pictorial representation of a conventional process for migrating digital patient image data from one long-term data storage media to another (e.g., newer) long-term data storage media. The process shown in FIG. 1 illustrates a conventional approach for storing patient image data in a typical PACS environment. As such, to implement process 100, medical diagnostic imaging scanners and devices such as, for example, Magnetic Resonance Imaging (MRI) scanner 102, Computer Tomography (CT) scanner 104, and x-ray, ultrasound and mammography film digitizing devices (e.g., 106) can generate patient diagnostic image data in digital form. Typically, in order to retain the patient image data for legally prescribed periods of time, the digital image data from scanners 102, 104 and/or digitizing device (s) 106 is formatted in accordance with the Digital Imaging and Communications in Medicine (DICOM) protocol (indicated by arrow 108), and transferred via conventional communications network 110 to PACS Archive 112. For example, communications network 110 may be a LAN, WAN, the Ethernet, the Internet, or any other publicly- or commercially-available communications network capable of conveying image data in digital form.

Once PACS Archive 112 receives and stores the transferred image data in DICOM form, the data can then be stored for finite periods of time on local disk cache 114. For example, the storage media used for local disk cache 114 can be fast magnetic disk, dense magnetic disk, or any other appropriate data storage technology. Periodically, a Hierarchical Storage Manager (HSM) application being executed by an operating system in PACS Archive 112 migrates the data from local disk cache 114 to long-term archive 116, which is controlled by this HSM application. For example, long-term archive 116 can be implemented as a tape library or optical "jukebox".

Typically, HSM applications are data storage systems that are used to automatically move data between high-cost and low-cost storage media. Data managers often use HSM applications for organizational data migration, because high-speed storage devices (e.g., hard disk drives) are significantly more expensive (e.g., per byte stored) than slower storage devices (e.g., magnetic tape drives or optical discs). HSM applications can be used to store most of an organization's data on the slower, less expensive media, and then copy the data to the more expensive, high-speed disk drives as needed. As such, an HSM can effectively convert an organization's high-speed storage devices into one or more caches for the slower storage devices.

Typically, PACS Archive 112 maintains a database with an index of patient demographics and the location or address where this data is stored in long-term archive 116. For example, the patient index information can include an identifier (e.g., number) associated with the storage media used, and an address for the location of the data stored on that media.

Various processes may be used to migrate data from a long-term storage device to another long-term storage device. For example, a data manager can have PACS Archive 112 initiate a process to retrieve patient data from (internally-controlled) long-term archive 116, and then send the data (e.g., via network 110) to a second (externally-controlled) long-term storage device. Typically, as illustrated by FIG. 1, the migrating data can be sent to a server associated with "external" HSM application 118. Examples of such "external" HSM applications are an Archival Storage Manager-Unix (ASM-Unix) application and/or server produced by Storage Technology Corporation, a Tivoli Storage Manager (TSM) application and/or server produced by IBM Corporation, or an HSM application and/or server produced by several other corporations.

As the data is migrated to "external" HSM application 118 (e.g., as indicated by arrow 122), the data is typically transferred in a non-DICOM format. A non-DICOM format commonly used for transferring data is the Binary Large Object (BLOB) format, which can represent data as a single entry from the internal database of PACS Archive 112. A BLOB format is often used in order for a data manager to provide allowances for image consolidation, loss-less image compression factors, and relative ease of access to "external" HSM archives.

External HSM application 118 receives and stores the migrated image data (e.g., in BLOB form). The received data can then be stored for finite periods of time on local disk cache 120. Periodically, external HSM application 118 migrates the data from local disk cache 120 to long-term archive 124, which is typically controlled by external HSM application 118.

The specific order in which patient data is migrated from one storage device (e.g., long-term archive 116) to another (e.g., long-term archive 124) can be based on a number of different factors. For example, the data may be migrated based on time stamps that identify when the data was stored. As such, a first-in, first-out (FIFO) or last-in, first-out (LIFO) migration approach may be used. Also, the data may be migrated on a patient-by-patient basis or patient classification basis (e.g., patient study-by-study basis).

In any event, as the patient data is migrated or transferred to external HSM application 118, the patient index information maintained in the database of PACS Archive 112 is updated as each unit of data is moved. This update approach enables PACS Archive 112 to still use the data during the typically extensive period while the migration is being performed. Nevertheless, a significant drawback of these conventional migration processes is that they are relatively inefficient, because the order in which the patient data is retrieved from long-term archive 116 is typically unrelated to the arrangement or layout of the data in the storage media involved. Consequently, the conventional data migration processes are inefficient and resource consuming (e.g., in terms of excessive computer, server, and network processing time, and long-term storage resources being inefficiently used). In fact, the typical data transfer rate of the conventional migration processes is approximately 5-20 Gbytes per day. As such, an average data migration process may take several weeks to complete. In a relatively large archive environment (e.g., >4 Tbytes), the data migration process can take up to several years.

Therefore, it would be desirable to have a method and system for increasing the data transfer rates and efficiencies of processes used for migrating digital data from one long-term storage media to a second long-term storage media, such as, for example, a PACS patient image data migration process.

SUMMARY OF THE INVENTION

The present invention provides a method, system and program for increasing the data transfer rates and efficiencies of processes used for migrating digital data from one long-term storage media to a second long-term storage media. A flat-file can be created and used as a work-list to read the data from the first long-term storage media. The data can then be transferred by data streaming to a workspace on a disk cache associated with the second long-term storage media. Logical units of the data in the workspace can be converted into a BLOB format and stored on a server associated with the second long-term storage media. A second flat-file can be created and used as an update reference for a database associated with the first long-term storage media. Using the second flat-file as a reference, a mass update of the database associated with the first long-term storage media can be performed to modify the database pointers so that they point to the locations of the BLOB data in the server associated with the second long-term storage media. After the data transfer from the first long-term storage media to the second long-term storage media is completed, the transferred data can be validated and the first long-term storage media retired.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
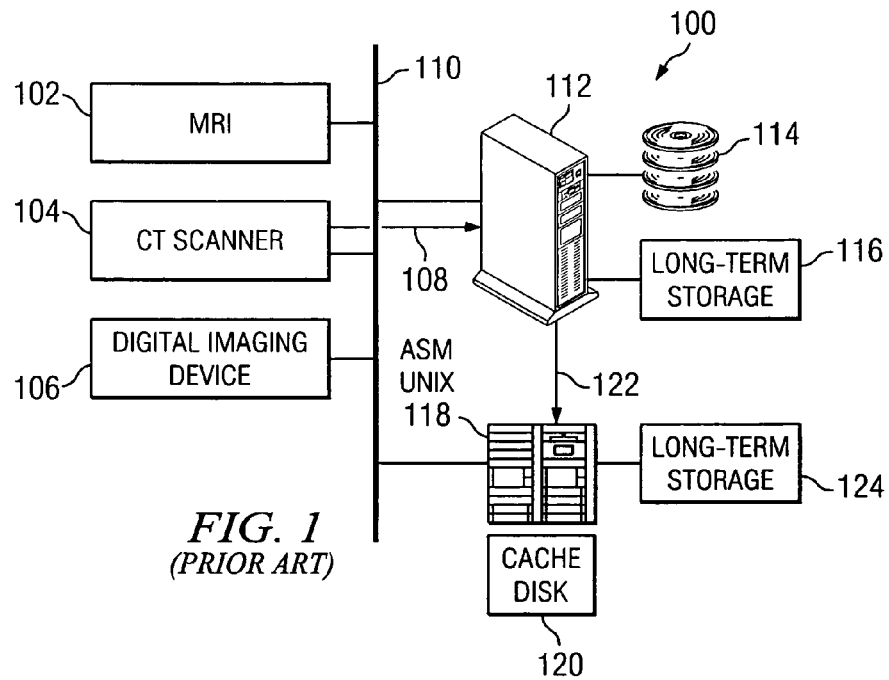
FIG. 1 depicts a pictorial representation of a conventional process for migrating patient image data from one data storage media to another data storage media.
Figure 2:
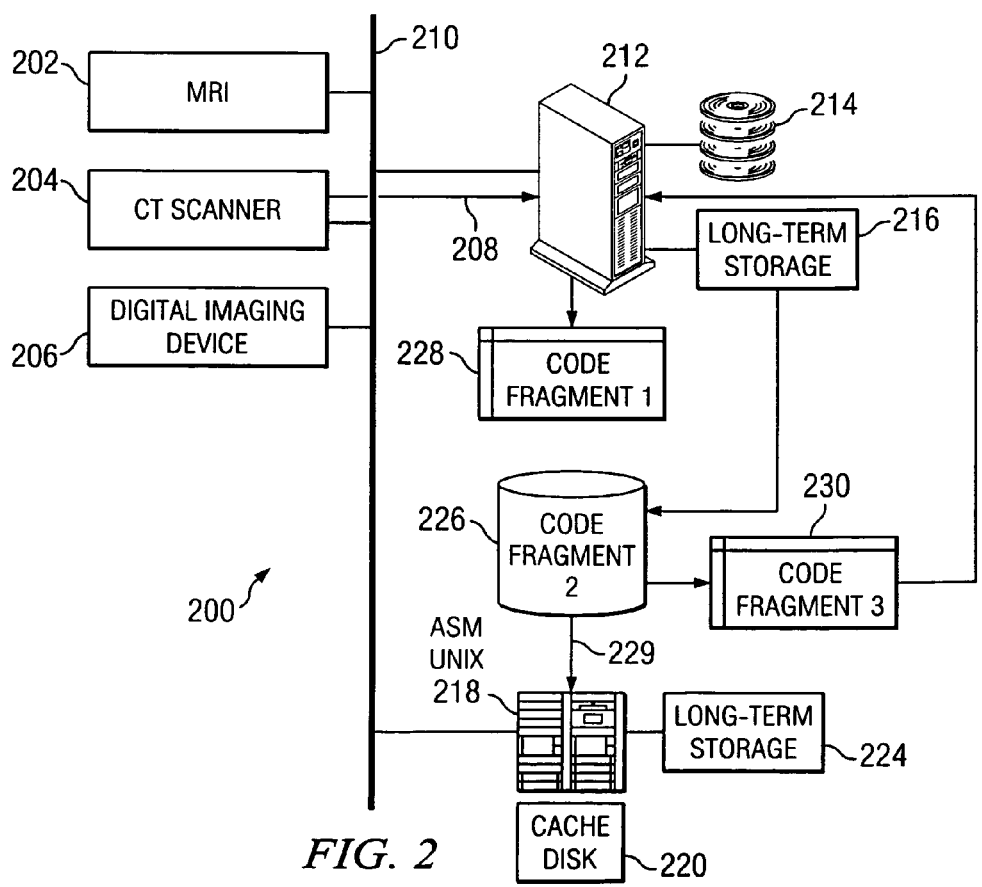
FIG. 2 depicts a pictorial representation of an exemplary system for collecting and storing patient image data in which the present invention may be implemented.

With reference now to the figures, FIG. 2 depicts a pictorial representation of an exemplary system for collecting and storing image data in which the present invention may be implemented. In accordance with a preferred embodiment of the present invention, exemplary system 200 can be used for collecting, storing and migrating digital patient diagnostic image data from a first storage media to a second storage media. For example, the first and/or second storage media may be long-term storage media or archives. As such, system 200 can include a plurality of patient medical diagnostic imaging scanners and/or devices such as, for example, Magnetic Resonance Imaging (MRI) scanner 202, Computer Tomography (CT) scanner 204, and x-ray, ultrasound and mammography film digitizing devices (e.g., 206) that can collect patient diagnostic image data and provide the image data in digital form. For this illustrative example, the digital image data from scanners 202, 204 and/or digitizing device(s) 206 can be formatted in accordance with the DICOM protocol (indicated by arrow 208), and transferred via communications network 210 to archive (e.g., PACS Archive) 212.

Communications network 210 may be a LAN, WAN, the Ethernet, the Internet, or any publicly- or commercially-available communications network capable of conveying image data (e.g., by data streaming) in digital form. As such, network 210 is an appropriate medium used to provide communications links between the various scanners, devices, computers, servers and storage media within system 200. Network 210 may include certain connections, such as, for example, wire, wireless communication links, or fiber optic cables.

For this exemplary embodiment, as archive 212 receives and stores the transferred image data in DICOM form, the data can then be stored for finite periods of time (e.g., temporarily) on local disk cache 214. The storage media used for local disk cache 214 can be fast magnetic disk, dense magnetic disk, or any other appropriate data storage technology. Periodically, an HSM application (not shown) typically executed as software instructions by an operating system in archive 212 can migrate the data from local disk cache 214 to long-term archive 216, which can be controlled by the HSM application. For example, long-term archive 216 may be implemented as a tape library, optical "jukebox" or other similar low speed storage media.

Figure 3:
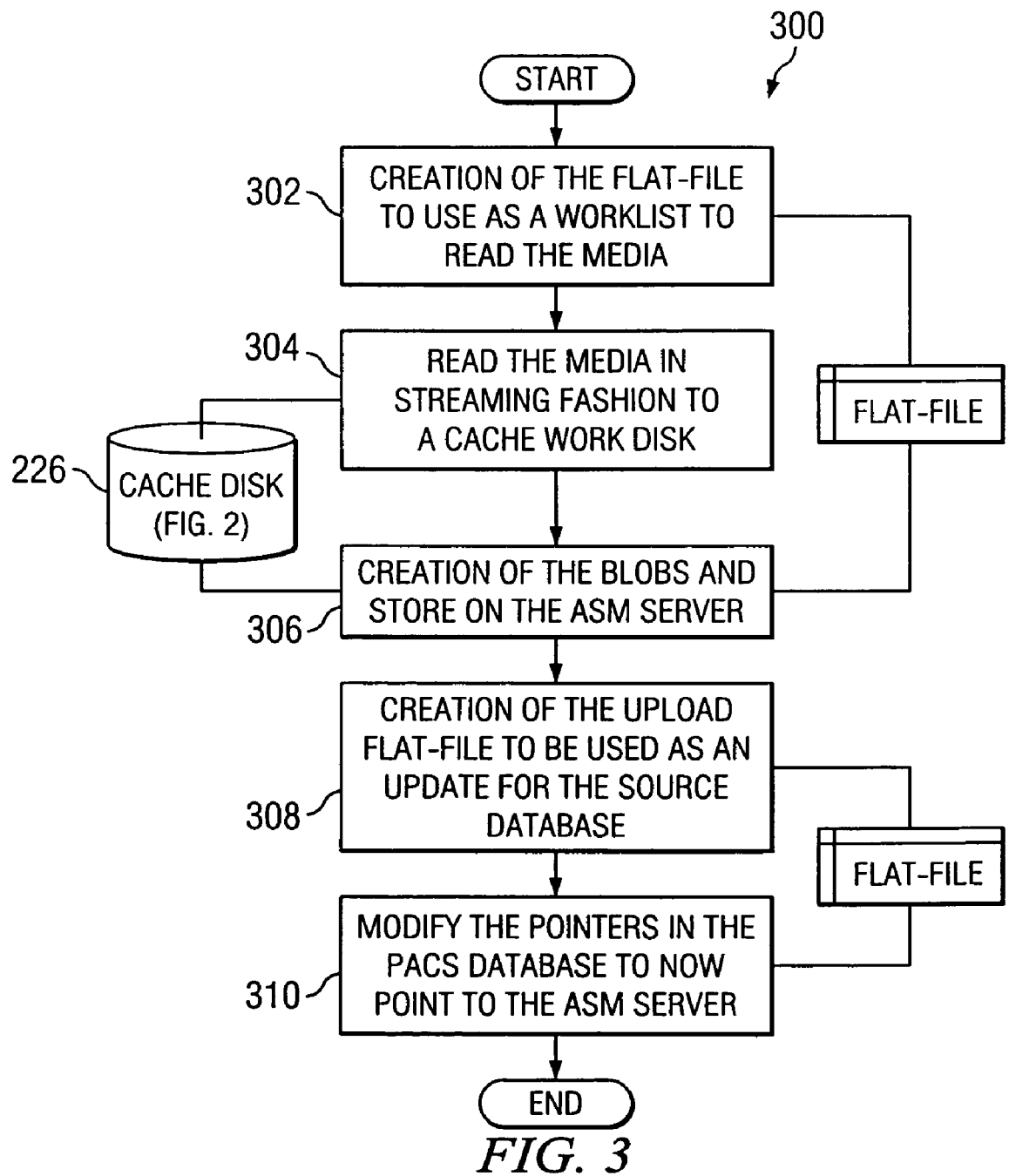
FIG. 3 is a flowchart depicting a method for migrating image data according to an exemplary embodiment of the present invention.

FIG. 3 is a flowchart depicting a method for migrating image data from a first storage media to a second storage media according to an exemplary embodiment of the present invention. For this example, the first storage media and second storage media are preferably long-term storage media used for archiving digital patient diagnostic image data.

Essentially, prior to performance of exemplary method 300, a data storage manager may modify the operation of archive (e.g., PACS Archive) 212 by having the HSM application associated with archive 212 place long-term archive 216 into a read-only mode. Subsequently, all newly acquired image data to be archived can be sent to archive 212 and then stored (e.g., temporarily) on local disk cache 214. For example, an HSM application (not shown) associated with, and executed by, an operating system in archive 212 can manage the transfer of the image data from archive 212 to local disk cache 214. Also, the image data can be conveyed to and stored in local disk cache 220 by "external" HSM application 218. At this point, it may be assumed that all of the image data selected for storage in long-term archive 216 is a complete data set for migration. Also, it may be assumed at this point that any image data that remains in local disk cache 214 can be transferred to local disk cache 220 by external HSM application 218, whenever the internal HSM application in archive 212 determines that the image data being acquired is to be archived.

Referring now to exemplary method 300 (in conjunction with FIG. 2), the internal database of archive 212 can be used by the HSM application associated with archive 212 to create a flat-file. This flat-file can include enough essential information needed to identify valid image data on the storage media of archive 212 (step 302). In other words, for this example, the pertinent data (associated with the image data to be migrated) in the internal database of archive 212 can be exported to a flat-file. For this example, such a flat-file can be defined as a single file containing flat (e.g., ASCII) characters representing or encoding some structure or portion of the database involved. Typically, flat-files are more portable between different operating systems and application programs than binary files.

For this exemplary embodiment, the generated flat-file can be used as a "work-list" for retrieving valid patient image data from long-term storage media 216 associated with archive 212. For example, the flat-file can include a subset of the patient image identification information, such as the patient's name, associated data accession number, date of the patient's examination, as well as the identity of the specific storage media involved, and the location or address of the patient's data on that media. The flat-file can also include any other pertinent information related to patients such as, for example, corrected or replacement images located on the same storage media or on sections of other storage media. As such, for this exemplary embodiment, this flat-file (228) can be a code fragment that contains pertinent information about the internal structure of the database of archive 212, and also how the image data is stored on long-term archive 216.

Next, using the "work list" in flat-file 228, the HSM application in archive 212 can control a server to read (e.g., sequentially) and transfer the image data residing in long-term archive 216 to (temporary) disk cache 226 (step 304). In this case, disk cache 226 may be considered as a temporary data migration "workspace". As such, the preferred approach of reading and transferring the image data sequentially is a relatively efficient technique related to "streaming" large quantities of data. Typically, the sequential reading and data "streaming" process of the present invention may be performed at a rate of more than 10 Gbytes per hour. However, as a practical matter, the ability to actually reach such a "streaming" rate depends to a great extent on the specific media from which the image data is being read.

For this example, once a selected amount of data has been transferred from long-term archive 216 to the temporary "workspace" of disk cache 226, "external" HSM application 218 can extract predefined, "logical" units of image data from the temporary "workspace" and convert that data to a BLOB format (step 306). For this example, the BLOB data is preferably converted from the image data in the temporary "workspace" in a manner that maintains data compatibility with a DICOM-formatted archive.

After the BLOB image data is generated from the temporary "workspace" of disk cache 226, external HSM application 218 can migrate the resulting BLOB data to long-term archive 224. For example, the BLOB data can be stored on a server associated with "external" HSM application 218. For this exemplary embodiment, "external" HSM application 218 may be implemented in software and hardware as an ASM-Unix application/server or similar device.

Additionally, for this exemplary embodiment, as the BLOB data is being generated, "external" HSM application 218 can generate a second flat-file (e.g., code fragment 2) 229 (step 308). For example, second flat-file 229 can include pertinent information about the specific patient data contained in each BLOB. Also, external HSM application 218 can generate a unique identifier associated with each such BLOB. The (upload) flat-file can be used as an update file for the source database (e.g., database of archive 212).

After all of the data stored in first long-term archive 216 has been migrated to, and stored in, second long-term archive 224, a data validation process may be initiated. For example, the HSM application in archive 212 can perform an audit of first flat-file (code fragment 1) 228, and a detailed comparison of first flat-file 228 with second flat-file 229 (code fragment 2). At this point in the present process, the HSM application in archive 212 can perform any necessary corrective steps, such as, for example, data correction, data clean up, or corrections to damaged storage media or stored images.

If so desired by a data manager, once a "clean" version of the data in external HSM archive 224 and second flat-file 229 is created, the database in archive 212 can be backed up (e.g., on disk cache 214). Then, "external" HSM application 218 can execute a third code fragment. For this exemplary embodiment, third code fragment 230 can use the data contained in the second flat-file as input data, and provide an update for the database in archive 212 with the information necessary for that database to access the patient data now stored in BLOB format in "external" archive 224 (step 310). Preferably, the database update operation is performed one time. Essentially, using third code fragment 230 as a reference, the HSM application in archive 212 performs a mass update of the database in archive 212.

Advantageously, after the mass update of the database in archive 212 is completed, the pointers in the database of archive 212 are now pointed to the locations of the migrated data at external HSM application 218. Therefore, the database of archive 212 can be associated with the storage locations of the migrated data at external HSM application 218. As such, third code fragment 230 includes necessary information about how the database in archive 212 is structured and has to be updated in order to access data that is normally controlled by "external" HSM application 218. After the database in archive 212 has been updated and proper access to the patient image data in "external" archive 224 has been verified, long-term archive 216 may be retired.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for migrating data from a first storage media to a second storage media, the method comprising the steps of:
creating a first file, said first file including information associated with the data to be migrated and said first storage media;
responsive to said information, reading said data from said first storage media;
transferring said data to a temporary workspace such that said data is no longer available from said first storage media, said temporary workspace associated with said second storage media wherein the transferring step comprises streaming said data from said first storage media to said second storage media;
formatting said data at said temporary workspace for compatibility with said second storage media; and
creating a second file, said second file including second information associated with said formatting of said data and an updating of said first storage media to access said data at said second storage media.

2. The method of claim 1, wherein at least one of said first storage media and said second storage media comprises a long-term archive.

3. The method of claim 1, wherein said first storage media comprises a PACS archive.

4. The method of claim 1, wherein said data comprises image data.

5. The method of claim 1, wherein said data comprises digital data.

6. The method of claim 1, wherein said data comprises patient diagnostic image data.

7. The method of claim 1, wherein said first file comprises a flat-file.

8. The method of claim 1, wherein said second file comprises a flat-tile.

9. The method of claim 1, wherein the formatting step comprises converting said data to a BLOB format.

10. The method of claim 1, wherein said temporary workspace comprises a disk cache.

11. The method of claim 1, wherein said second information includes a plurality of pointers associated with a database for said data to be migrated, and a modification of said plurality of pointers, said modification associating said plurality of pointers to said data at said second storage media.

12. A system for migrating data from a first storage media to a second storage media, comprising:
a first data manager, said first data manager associated with said first storage media;
a second data manager, said second data manager associated with said second storage media; and
a workspace, said workspace associated with said second storage media and coupled to said first storage media, said first data manager operable to:
create a first file, said first file including information associated with the data to be migrated and said first storage media;
responsive to said information, read said data from said first storage media; and
transfer said data to said workspace such that the data is no longer available from said first storage media;
said second data manager operable to:
format said data at said workspace for compatibility with said second storage media; and
create a second file, said second file including second information associated with said format of said data and an update of said first storage media in order for said first data manager to access said data at said second storage media without querying for its location.

13. The system of claim 12, wherein at least one of said first storage media and said second storage media comprises a long-term archive.

14. The system of claim 12, wherein said first storage media comprises a PACS archive.

15. The system of claim 12, wherein said data comprises digital patient diagnostic image data.

16. The system of claim 12, wherein each of said first file and said second file comprises a flat-file.

17. The system of claim 12, wherein the transfer operation comprises an operation of streaming said data from said first storage media to said second storage media.

18. The system of claim 12, wherein the format operation comprises an operation of converting said data to a BLOB format.

19. A computer program product in a computer readable medium for use in a data processing system, for migrating data from a first storage media to a second storage media, the computer program product comprising:
first instructions for creating a first file, said first file including information associated with the data to be migrated and said first storage media;
second instructions for reading said data from said first storage media, said second instructions responsive to said information;
third instructions for transferring said data to a temporary workspace such that said data is no longer available from said first storage media, said temporary workspace associated with said second storage media wherein the transferring step comprises streaming said data from said first storage media to said second storage media;
fourth instructions for formatting said data at said temporary workspace for compatibility with said second storage media; and
fifth instructions for creating a second file, said second file including second information associated with said formatting of said data and an updating of said first storage media to access said data at said second storage media.

* * * * *